UNITED STATES PATENT OFFICE.

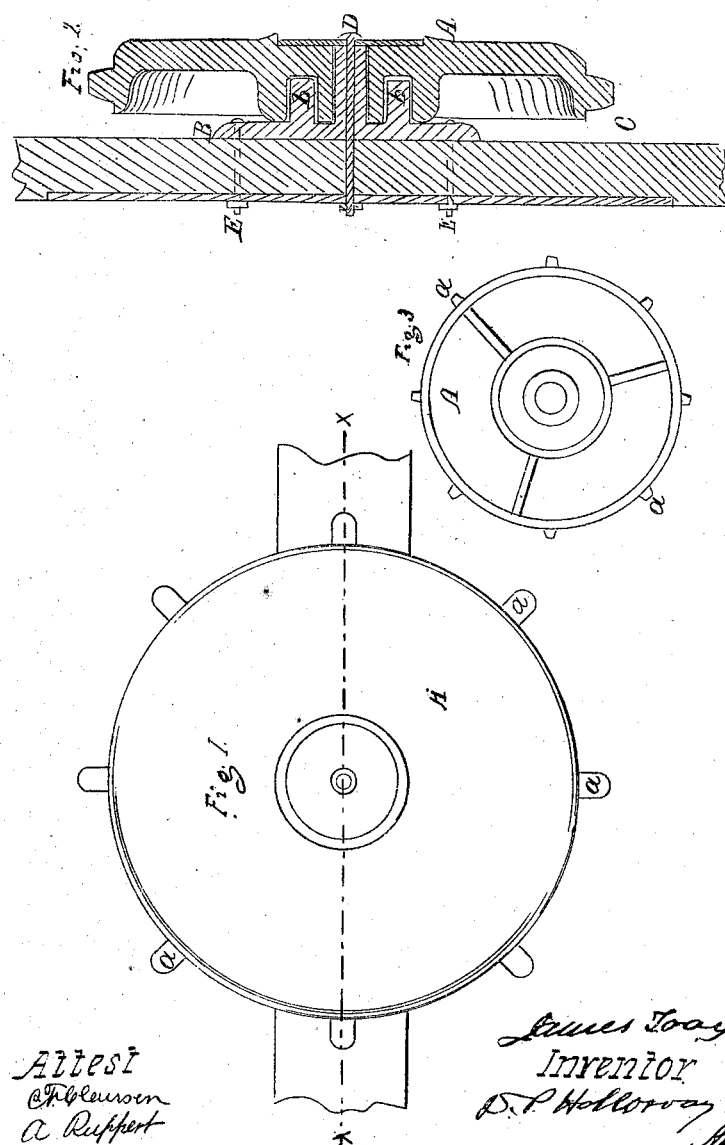

JAMES TOAY, OF MINERAL POINT, WISCONSIN.

IMPROVEMENT IN HARVESTERS.

Specification forming part of Letters Patent No. 83,568, dated October 27, 1868.

*To all whom it may concern:*

Be it known that I, JAMES TOAY, of Mineral Point, in the county of Iowa and State of Wisconsin, have invented a new and useful Improvement in Harvesters; and I do hereby declare that the following is a full, clear, and exact description of the same, reference being had to the annexed drawing, making part of this specification, in which—

Figure 1 is a top or outside view of a chain-wheel for a harvester's rake. Fig. 2 is a horizontal transverse section of the same on the line $x\,x$ of Fig. 1, and Fig. 3 is a bottom or inside view thereof.

Corresponding letters refer to corresponding parts in the several figures.

This improvement relates to the wheel around which the chain or belt passes which carries the rake in harvesting-machines; and it consists in providing such wheels with means for preventing them from becoming choked with straw, grass, or other substances while in operation, as will be hereinafter described.

With these wheels, as heretofore constructed, great difficulty has been experienced on account of there not being any provision for preventing the straw from winding around the hubs thereof, and either preventing them from rotating or forcing them upward or outward, until the bolt which holds them to the hub upon which they rotate is broken.

My invention is designed to effectually remedy this evil, which is effected by the construction of said wheel and the hub or plate upon which it rotates, which I will now proceed to describe.

A is the chain wheel or pulley over which the chain or belt passes in its movements, and it is constructed with projections $a$ upon its periphery, and otherwise in the usual manner, except that it has upon its inner face a hub, which projects a distance of, say, two inches, more or less. About midway of this hub, or so as to leave about an equal body of metal on either side thereof, a groove of about one-half to three-fourths of an inch in width and about one inch in depth is formed for the reception of a corresponding projection formed upon the plate B, which forms the bearing-surface of said wheel.

B is a plate of metal, secured to the frame-work of the machine by the bolts E E, and having upon its outer-face a circular projecting flange, which is of proper depth and thickness to fit loosely in the groove formed in the wheel, as above described. It also has upon the same face, and located centrally within said projecting flange, a hub, which projects sufficiently far to pass through the wheel A, which hub forms the bearing-surface upon which said wheel rotates.

D is a bolt, which passes through the center of wheel A, also centrally through plate B, and through that portion of the frame to which they are to be secured, for the purpose of holding them in their relative positions, said bolt being provided with a washer upon its outer end, which fits into a recess formed for its reception in the outer surface of wheel A.

E E are bolts, which secure plate B to the frame, thus securing the plate and wheel in their proper positions with reference to the chain or rake.

It will be seen that when the wheel A and plate B are constructed as above described, and as shown in Fig. 2, a largely-increased bearing-surface is presented, and that, owing to its construction, no straw can pass or get under or between the surfaces of the two; and it will be seen that the space in the wheel between the projection $b$ on plate B and the bottom of the groove may be filled with oil for lubricating the same, which will obviate the necessity of often removing the wheel for that purpose.

Having thus described my invention, what I claim, and desire to secure by Letters Patent, is—

1. The wheel A, constructed substantially as shown and described.
2. The plate B, constructed substantially as shown and described.
3. The combination of wheel A, plate B, and the frame-work of a harvesting-machine, substantially as shown and described.

In testimony whereof I have signed my name to this specification in the presence of two subscribing witnesses.

JAMES TOAY.

Witnesses:
EDM. F. BROWN,
D. P. HOLLOWAY.